(12) United States Patent
Wu et al.

(10) Patent No.: US 8,422,660 B1
(45) Date of Patent: Apr. 16, 2013

(54) COMMUNICATION SYSTEM HAVING COMMON GROUND MECHANISM

(75) Inventors: Tai-Lin Wu, New Taipei (TW);
Tai-Shing Wan, Taoyuan County (TW)

(73) Assignee: Quanta Computer Inc., Taoyuan Shien (TW)

( * ) Notice: Subject to any disclaimer, the term of this patent is extended or adjusted under 35 U.S.C. 154(b) by 0 days.

(21) Appl. No.: 13/467,480

(22) Filed: May 9, 2012

(30) Foreign Application Priority Data

Dec. 29, 2011  (TW) .............................. 100149571 A

(51) Int. Cl.
*H04M 3/00* (2006.01)
*H04M 5/00* (2006.01)
*H04M 1/00* (2006.01)
*H04M 9/00* (2006.01)

(52) U.S. Cl.
USPC ....... 379/326; 379/325; 379/328; 379/392.01

(58) Field of Classification Search .................. 379/326, 379/325, 327, 328, 392.01, 392
See application file for complete search history.

(56) References Cited

U.S. PATENT DOCUMENTS

2001/0040960 A1* 11/2001 Hamami et al. .............. 379/352
2008/0165950 A1* 7/2008 Chang ...................... 379/399.01

* cited by examiner

*Primary Examiner* — Thjuan K Addy
(74) *Attorney, Agent, or Firm* — Rabin & Berdo, P.C.

(57) ABSTRACT

A communication system having a common ground mechanism is provided. The communication system comprises a local host, a local telephone device, a sound input path and a sound output path. The local telephone device is connected to a remote telephone device through a telecom facility. The sound input path comprises a first transformer module and is connected between the local telephone device and the local host such that the local telephone device may transfer a sound input to the local host. The sound output path comprises a second transformer module and is connected between the local telephone device and the local host such that the local telephone device may receive a sound output from the local host. The first and the second transformer modules couple a first ground of the telecom facility and a second ground of the local host together such that the first and second grounds are common-grounded.

10 Claims, 3 Drawing Sheets

COMMUNICATION SYSTEM HAVING COMMON GROUND MECHANISM

RELATED APPLICATIONS

This application claims priority to Taiwan Application Serial Number 100149571, filed Dec. 29, 2011, which is herein incorporated by reference.

BACKGROUND

1. Technical Field

The present invention relates to a communication technology. More particularly, the present invention relates to a communication system having a common ground mechanism.

2. Description of Related Art

A digital communication system brings convenience to people's daily life, in which the digital communication system can convert a user's analog voice signal and/or image to a digital signal for transmission to perform communication. When a multi-user videoconference is performed, signals are often transmitted through a network. However, when one of the participants does not have a computer system that can perform the multi-user conference, the conference cannot be held. Accordingly, it is necessary to provide a device that can establish a multi-user conference when at least one of the participants does not have the computer system.

SUMMARY

An aspect of the present disclosure is to provide a communication system. The communication system has a common ground mechanism. The communication system comprises a local host, a local telephone device, a sound input path and a sound output path. The local telephone device communicates with a remote telephone device through a telecom facility. The sound input path comprises a first transformer module and is connected between the local telephone device and the local host for allowing the local telephone device to transfer a sound input to the local host. The sound output path comprises a second transformer module and is connected between the local telephone device and the local host for allowing the local telephone device to receive a sound output from the local host. The first and the second transformer modules couple a first ground of the telecom facility and a second ground of the local host together such that the first ground and the second ground are common-grounded.

It is to be understood that both the foregoing general description and the following detailed description are by examples, and are intended to provide further explanation of the invention as claimed.

BRIEF DESCRIPTION OF THE DRAWINGS

The invention can be more fully understood by reading the following detailed description of the embodiment, with reference made to the accompanying drawings as follows.

DETAILED DESCRIPTION

Figure 1:
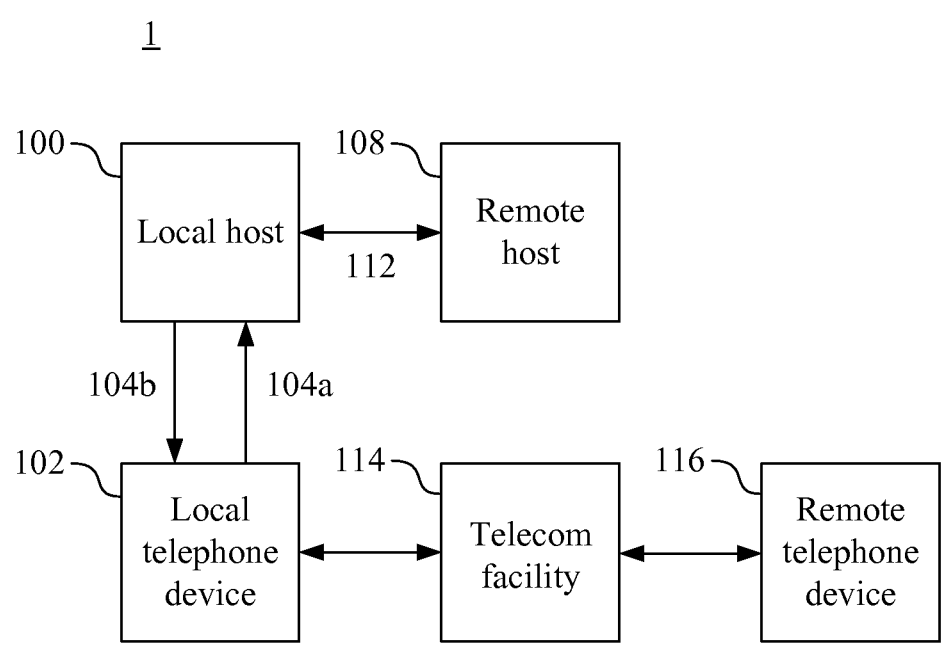
FIG. 1 is a communication system having a common ground mechanism according to an embodiment of the present disclosure.

Reference will now be made in detail to the present embodiments of the invention, examples of which are illustrated in the accompanying drawings. Wherever possible, the same reference numbers are used in the drawings and the description to refer to the same or like parts.

FIG. 1 is a communication system 1 having a common ground mechanism according to an embodiment of the present disclosure. The communication system 1 comprises a local host 100, a local telephone device 102, a sound input path 104a and a sound output path 104b.

In an embodiment, the local host 100 is a computer host such as a desktop computer, a laptop computer or a cell phone that has a processor, a memory, a monitor, a hard disk, a network module and I/O ports of speaker and microphone. The local telephone device 102 can communicate with remote telephone devices through a telecom facility 114, i.e. a public switch telephone network (PSTN). The local telephone device 102 typically comprises a speaker port and a microphone port. In some embodiments, an audio source port is disposed on the local telephone device 102 for receiving or transmitting an audio signal including speaker signal. In an embodiment, the local telephone device 102 is electrically connected to the local host 100 through a cable for receiving or transmitting the audio signal. For example, a first participant may receive a speaker signal, from the remote telephone device 116, of the local telephone device 102 directly at the local host 100 through the sound input path 104a. In other words, the speaker of the local host 100 is used to play the speaker signal from a remote telephone device 116 that is received through the local telephone device 102. For example, the microphone signal of the local host 100 from the first participant may be transferred to the local telephone device 102 through the sound output path 104b and then transmitted to the remote telephone device 116, such that the first participant could speak directly towards the local host 100 instead of the local telephone device 102. In an embodiment, the local telephone device 102 and the local host 100 are two independent devices. In another embodiment, the local telephone device 102 can be integrated into the local host 100.

Accordingly, in the present disclosure, the speaker port and the microphone port of the local host 100 allows the local host 100 to receive the signal from the local telephone device 102 directly and allows the local host 100 to transfer the signal to the local telephone device 102 directly as well such that the local host 100 can function as telephone, thus providing more user convenience.

Besides the function described above, the communication system 1 is applicable to a multi-user conference. In an embodiment, the local host 100 (the first participant) can perform communication with more than one remote host through network 112. In the present embodiment, the local host 100 can perform communication with a remote host 108 (the second participant) by holding a videoconference (having both video and audio signals). Further, the local telephone device 102 can perform communication with a remote telephone device 116 (the third participant) through the telecom facility 114. The difference between the second participant and the third participant is that the third participant does not have the computer host for performing communication through the network. Hence, the third participant cannot participate in the videoconference. However, the third participant can still participate in the conference through the audio communication by using the communication system 1 of the present disclosure while the first participant and the second participant may use either video communication or audio communication through the network. Consequently, the third participant can still participate in the multi-user communication without being restrained by the condition of not having the network communication device.

Figure 2:
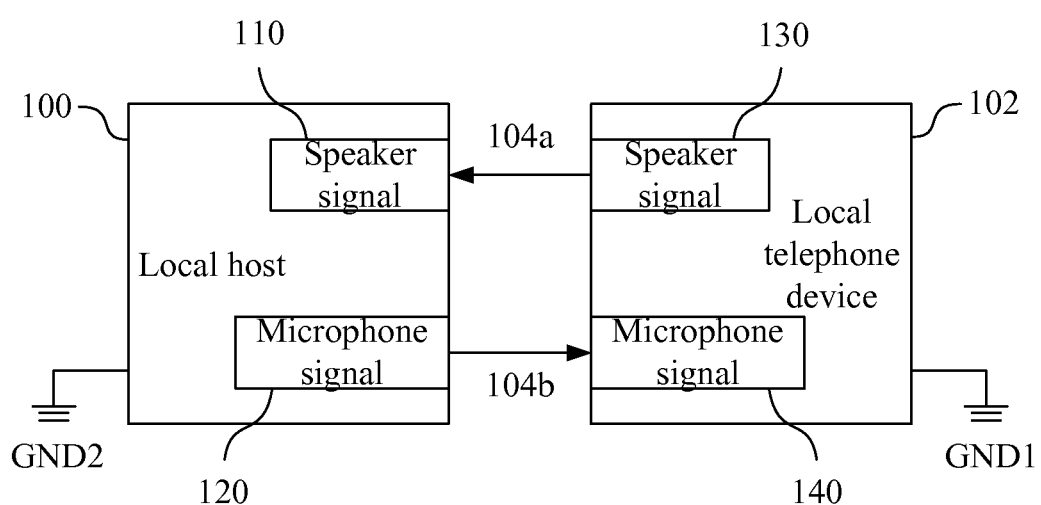
FIG. 2 is a diagram showing a local host and a local telephone device according to an embodiment of the present disclosure.

FIG. 2 is a diagram showing the local host 100 and the local telephone device 102 according to an embodiment of the present disclosure. The sound input path 104a is established by transmitting the speaker (SPK) signal 130 of the local telephone device 102 through a cable such that the local host 100 may receive the speaker signal 110. Similarly, the sound output path 104b is established by transmitting the microphone (MIC) signal 120 of the local host 100 through a cable such that the local telephone device 102 may receive the microphone signal 140. The speaker signal 130 and the microphone signal 140 of the local telephone device 102 could be retrieved through an audio source port of the local telephone device 102. The speaker signal 110 and the microphone signal 120 of the local host 100 could be retrieved through a speaker port and a microphone port of an audio signal port of the local host 100. In an embodiment, the audio source port of the local telephone device 102 and the audio signal port of the local host 100 are connected by using a stereo jack so as to retrieve signals through the tip and ring on the stereo jack.

It is noted that the signal transmitted by the local telephone device 102 uses a first ground GND1 of the telecom facility 114 as a reference ground potential, and the signal transmitted by the local host 100 uses a second ground GND2 that is different from the first ground GND1 as another reference ground potential. Consequently, noise is easily caused during the communication between the local telephone device 102 and the local host 100 due to not being common ground.

Figure 3:
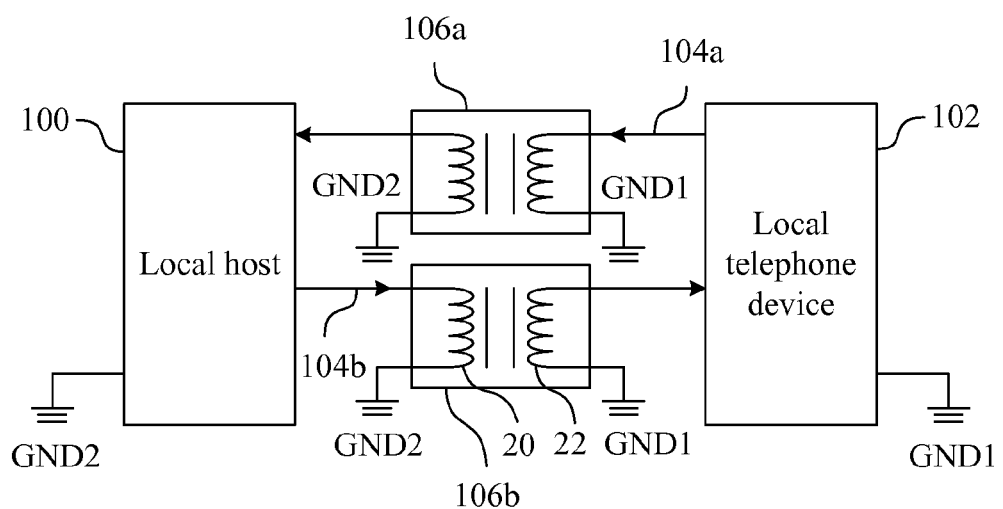
FIG. 3 is a detailed diagram of the communication system depicted in FIG. 1 according to an embodiment of the present disclosure.

FIG. 3 is a detailed diagram of the communication system 1 depicted in FIG. 1 according to an embodiment of the present disclosure. The sound input path 104a comprises a first transformer module 106a connected between the local telephone device 102 and the local host 100. The sound output path 104b comprises a second transformer module 106b connected between the local telephone device 102 and the local host 100. Each of the first and the second transformer module 106a and 106b comprises a primary side inductor 20 and a secondary side inductor 22 for coupling the first ground GND 1 of the telecom facility 114 and the second ground GND2 of the local host 100. The first and the second transformer modules 106a and 106b couple the first ground GND1 of the telecom facility 14 and the second ground GND2 of the local host 100 together such that the telecom facility 14 and the local host 100 are common-grounded to avoid generating the noise.

Therefore, an audio signal can be transmitted and received between the local host 100 and the local telephone device 102 through the sound input path 104a and the sound output path 104b. In other words, the audio port of the local host 100 can provide communication function such that the local host 100 can perform communication with the remote telephone device 116 through the telecom facility 114. Besides, the communication system 1 depicted in FIG. 1 of the present disclosure can perform a multi-user conference through the network 112 and the telecom facility 114 so as to allow the third participant (116) participating in the conference without network devices.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims.

What is claimed is:

1. A communication system having a common ground mechanism comprising:
   a local host;
   a local telephone device to communicate with a remote telephone device through a telecom facility;
   a sound input path which comprises a first transformer module and is connected between the local telephone device and the local host for allowing the local telephone device to transfer a sound input to the local host; and
   a sound output path which comprises a second transformer module and is connected between the local telephone device and the local host for allowing the local telephone device to receive a sound output from the local host;
   wherein the first transformer module and the second transformer module couples a first ground of the telecom facility and a second ground of the local host together such that the first ground and the second ground are common-grounded.

2. The communication system of claim 1, wherein the telecom facility is a public switch telephone network (PSTN).

3. The communication system of claim 1, wherein the local host performs communication with at least one remote host through a network.

4. The communication system of claim 3, wherein the remote telephone device performs communication with the remote host through the local telephone device and the local host.

5. The communication system of claim 4, wherein the local host and the remote host perform a video communication or a voice communication.

6. The communication system of claim 5, wherein the sound output is a microphone signal transmitted to the local telephone device for performing transmission.

7. The communication system of claim 6, wherein the sound input is a speaker signal retrieved from the local telephone device for performing transmission.

8. The communication system of claim 7, wherein each of the first transformer module and the second transformer module comprises a primary side inductor and a secondary side inductor to couple the first ground and the second ground.

9. The communication system of claim 8, wherein the sound input path and the sound output path are formed by connecting an audio signal port of the local host to an audio source port of the local telephone device.

10. The communication system of claim 9, wherein the audio signal port of the local host comprises a speaker port and a microphone port.

* * * * *